No. 884,038. PATENTED APR. 7, 1908.
M. T. PARKS.
SEA SOUNDING APPARATUS.
APPLICATION FILED JUNE 5, 1907.
4 SHEETS—SHEET 1.
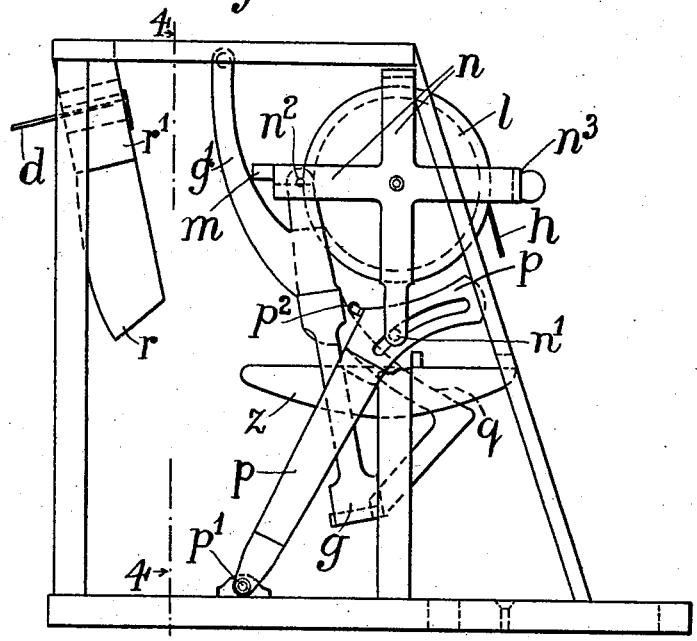
Fig:1
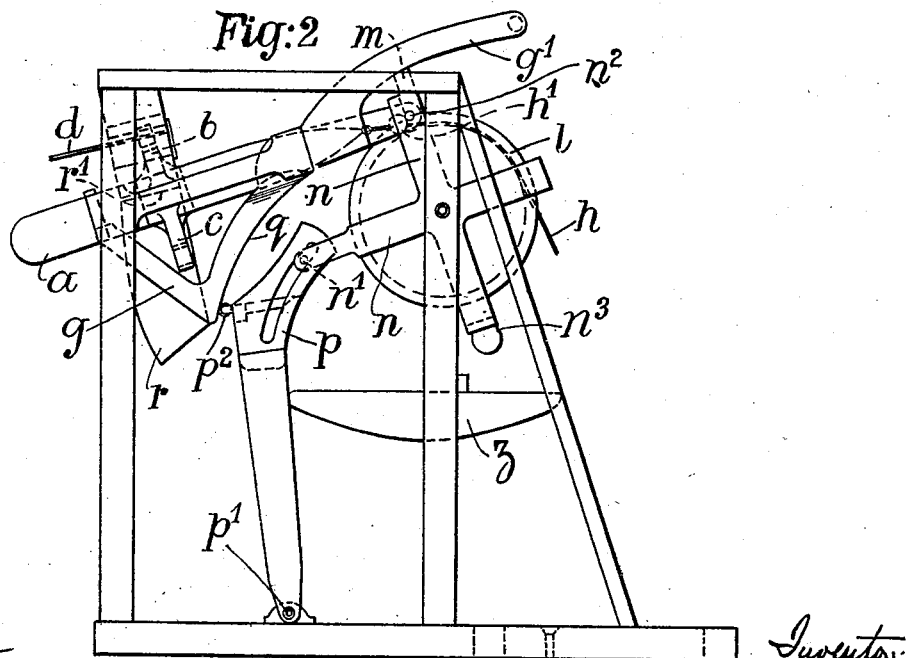
Fig:2

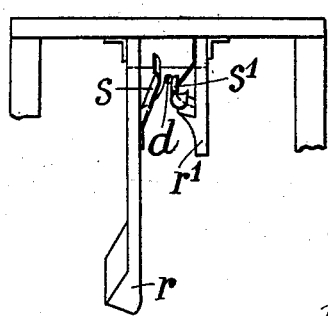
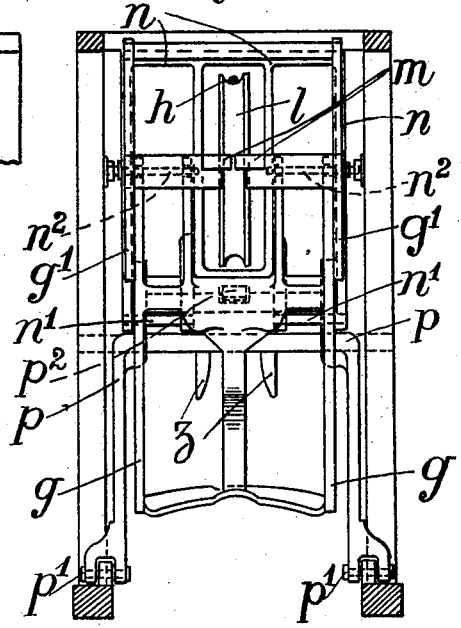
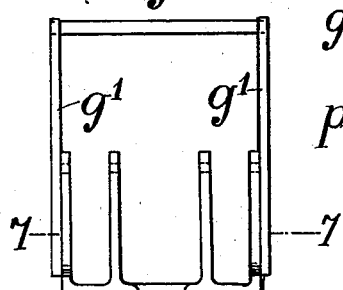
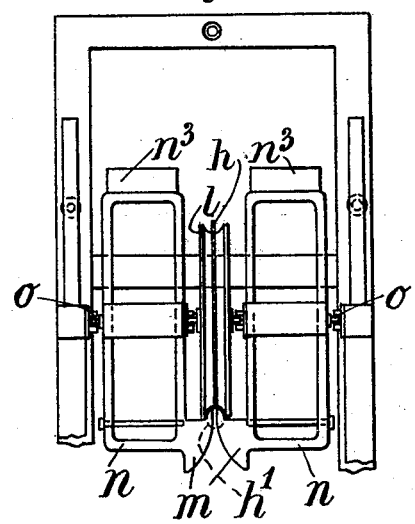
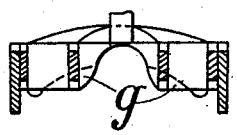

No. 884,038. PATENTED APR. 7, 1908.
M. T. PARKS.
SEA SOUNDING APPARATUS.
APPLICATION FILED JUNE 5, 1907.
4 SHEETS—SHEET 3.
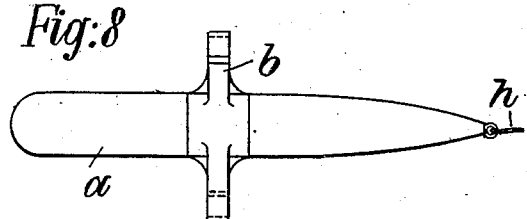
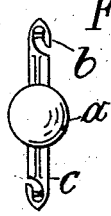
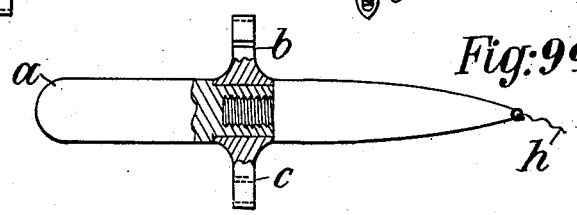
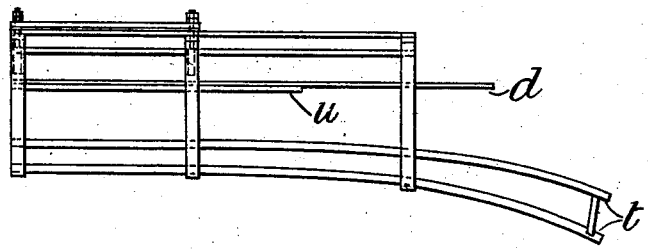
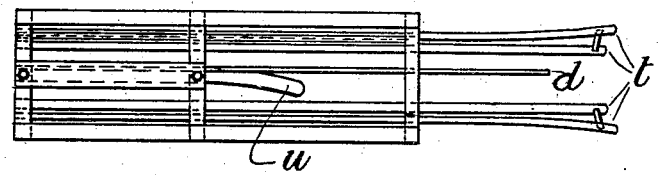
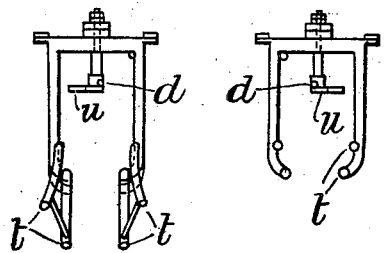

No. 884,038. PATENTED APR. 7, 1908.
M. T. PARKS.
SEA SOUNDING APPARATUS.
APPLICATION FILED JUNE 5, 1907.
4 SHEETS—SHEET 4.
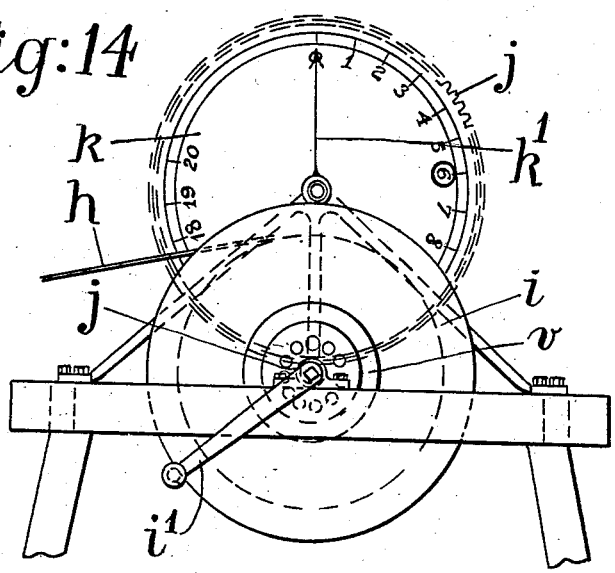
Fig:14
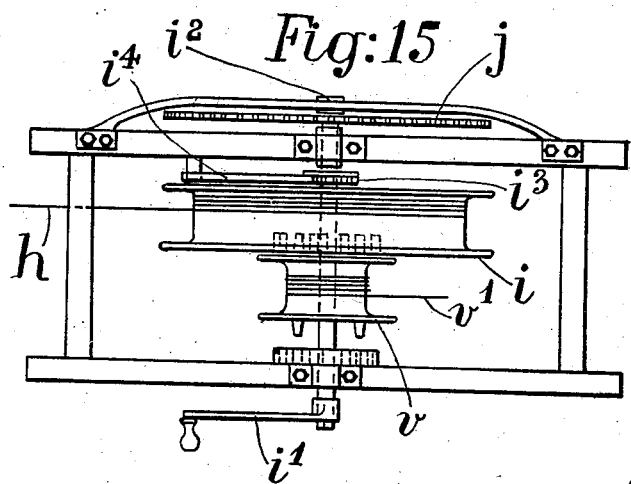
Fig:15
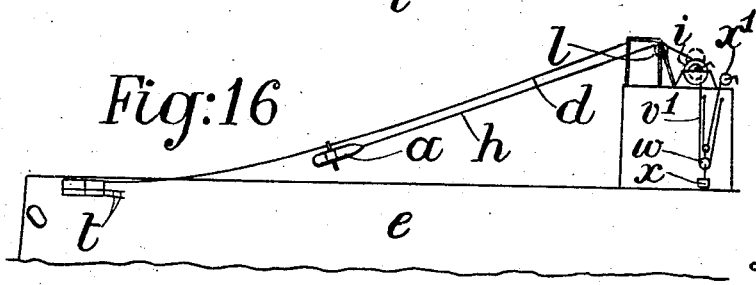
Fig:16

UNITED STATES PATENT OFFICE.

MURRAY THOMAS PARKS, OF LYDD, ENGLAND.

SEA-SOUNDING APPARATUS.

No. 884,038.

Specification of Letters Patent.

Patented April 7, 1908.

Application filed June 5, 1907. Serial No. 377,413.

*To all whom it may concern:*

Be it known that I, MURRAY THOMAS PARKS, a subject of the King of Great Britain, residing at Lydd, in the county of Kent, England, have invented new and useful Improvements in Sea-Sounding Apparatus, of which the following is a specification.

The object of the present invention is to construct apparatus for heaving a lead mechanically, and to combine therewith apparatus whereby the amount of line out may be readily and accurately ascertained.

The invention is illustrated in the accompanying drawings, in which

Figure 1 is a side elevation of the apparatus for heaving the lead, part of the frame being broken away for the sake of clearness. Fig. 2 is also a side elevation of the same apparatus with the lead raised and in position to be heaved. Fig. 3 is a front elevation of the part of the apparatus for guiding the lead correctly onto the wire upon which it runs. Fig. 4 is a vertical section on the line 4—4 of Fig. 1, seen in the direction indicated by the arrow. Fig. 5 is a plan of that part of the apparatus shown in Fig. 4. Fig. 6 is a front elevation of the cage for raising the lead, and Fig. 7 is a cross section on the line 7—7 of Fig. 6. Figs. 8 and 9 are respectively side and end elevations of the lead. Fig. 9$^a$ is a sectional view of the same. Figs. 10 and 11 are respectively a side elevation and plan of the apparatus for releasing the lead from the carrying wire. Fig. 12 is a rear elevation of the same. Fig. 13 is a front elevation of the front part only of said apparatus. Fig. 14 is a side elevation and Fig. 15 is a plan of the drum which carries the wire or cord attached to the lead. Fig. 16 is a diagram showing a side elevation of the complete apparatus.

In carrying the invention into effect I employ a lead $a$, having two laterally projecting wings $b$, $c$, the ends of which are shaped as hooks, by means of one or other of which latter the lead $a$ travels along a stretched and inclined wire $d$, thus obtaining velocity by which it is thrown the required distance in front of the ship $e$. These wings $b$, $c$, are attached to a collar $f$ passing around the lead $a$. This collar $f$ must be capable of rotating freely around the lead.

The exterior surface of the collar $f$ is flush with the exterior of the lead. Any suitable bearing may be provided between the collar $f$ and the lead. When the collar $f$ is made from a single piece of metal as shown the lead may be made in two pieces which are connected together in any convenient manner. In Fig. 9$^a$ the left hand portion of the lead $a$ has an internally screwed sleeve and the right hand portion has a screw threaded projection screwing into the sleeve.

The lead $a$ is raised in a pivoted cage or frame $g$ until one of the hooks $b$ or $c$ has engaged the stretched wire $d$. The lead $a$ is attached to one end of a flexible wire $h$, which is wound on a drum $i$. This latter has means, such as the handle $i'$, whereby it may be rotated to wind in the lead $a$, and it is also provided with means whereby, as soon as the lead strikes the sea bottom, all the slack wire $h$ is taken up by a suitable multiplying gear, which is arranged to act very rapidly. In conjunction with the drum $i$, I employ suitable gearing $j$ for indicating, by means of the scale $k$ on one of the gear wheels and a fixed hand $k'$, the amount of wire $h$ run out. The multiplying gear has sufficient power and speed to rapidly take up the slack but it is not able to lift the lead $a$ from the bottom.

In one method of carrying the invention into effect as shown in the drawings, I employ a pulley $l$ over which the line $h$ passes from the drum $i$. The line $h$ has an enlargement $h'$ thereon which, when the line is hauled in, comes into contact with one pair of arms $m$, $m$, of a double bell-crank lever $n$, $n$, fixed on the axles $o$ carrying the pulley $l$. The bell-crank levers $n$, $n$, are arranged on each side of the pulley $l$, and their front arms $m$, $m$, are arranged at such a distance apart that they are engaged by the enlargement $h'$ on the line $h$ but allow the line to pass freely therethrough when the lead $a$ begins to run down its wire $d$ and the bell-cranks $n$, $n$, and cage $g$ fall back into their original position. Other arms of this bell-crank lever $n$ have pins or rollers $n'$ working in the two slotted arms of a lever $p$, which latter is fulcrumed at its lower part at $p'$. The upper part, connecting the two arms of this lever, has a roller $p^2$ which runs over a cam surface $q$ on the cage $g$ for the lead $a$, which cage $g$ is pivoted at $n^2$, to the front end of the bell crank levers $n$. The cage $g$ is prolonged at $g'$, beyond the points where it is pivoted to the bell-crank levers, and is weighted so that the cage portion proper $g$ has a normal tendency to remain in a position, as shown at Fig. 1, somewhat behind the vertical and out of the way of the lead $a$ when the latter is being hauled in. When the lead $a$ is hauled in, the enlargement $h'$ on the line $h$ rocks the bell-crank levers $n$, which latter move the slotted lever $p$, which in its turn, by means of the roller $p^2$, acts on the cam surface $q$ of the cage $g$ and causes this latter to move through an angle until it has nearly assumed a horizontal position, as shown at Fig. 2, and also raised the lead $a$ to the same position, so that one of the hooks $b$ or $c$ has engaged the wire $d$.

In order to insure the engagement of one of the hooks $b$ or $c$ with the wire $d$, I employ two guide plates $r$, $r'$, arranged in such a position that one or both of the hook-shaped wings comes or come into contact with the said guide plates $r$, $r'$, so that one hook is compelled to pass up between two springs $s$, $s'$, with the open side of the hook close to the stretched wire $d$. One of the springs ($s$) is stronger than the other ($s'$) and preferably acts against the end of the hook $b$ or $c$ to press this latter over the wire $d$.

When the hauling-in drum $i$ is released, the cage $g$ falls back and the lead $a$ runs down the wire $d$ by gravity. Towards the lower end of the wire I arrange two pairs of rods $t$, $t$, at a short distance apart, forming a guide or trough which gradually lifts the lead with respect to the wire $d$ until its hook is raised with the open part close to or level with the wire $d$. A suitable cam or guide plate $u$ is here arranged to wipe the hook sidewise out of contact with the stretched wire $d$. The guide terminates at this point and consequently the lead $a$ falls clear of the same into the sea.

The hauling-in drum $i$ may have a pulley $v$ on one of its sides, which is smaller than the diameter of the hauling surface. To this pulley $v$ is attached a flexible wire $v'$, a loop of which passes over a pulley $w$, and supports a weight $x$, which latter is calculated so that it can rapidly rotate the drum $i$ to haul in any slack line $h$ should the lead be on the bottom. The pulley $v$, which is on the side of the drum, is so constructed that it may be clutched with or unclutched from the hauling-in drum $i$ by sliding along the axle $i^2$.

In the drawings the pulley $v$ is shown with pins which enter holes in the drum $i$ but other forms of clutches may be employed as will be readily understood.

The lead will be generally attached to a line of such length that the lead may sink 20 fathoms. Each time the lead is hove, the indicator will show 20 fathoms until the ship gets into shallower water, when the indicator will run back and show the exact depth at which the lead strikes the bottom.

The arms $n^3$, $n^3$, of the bell-crank levers $n$, $n$, merely act to counter-balance the levers, thereby aiding in raising the lead. The arms $z$, $z$, fixed to the framing, act to prevent the lead $a$ swinging laterally when it is hanging by its wire $h$ from the pulley $l$.

The apparatus is used in the following manner. The lead is normally hanging between the arms $z$, $z$. The drum $i$ is rotated in one direction, thereby rotating the pulley $l$, rocking the levers $n$, $n$, and bringing the lead $a$ onto the wire $d$. The drum $i$ is then rotated in the opposite direction until the lead has arrived at the position indicated in Fig. 16. It is then at the same distance from the pulley $l$ as this latter is distant from the keel of the ship which position is indicated on the scale $k$ by a circle for instance (preferably red). In Fig. 14 a circle is shown around the Fig. 6. It will be understood that the scale $k$ can never indicate less water than the figure inside the said red circle. It is therefore unnecessary for the weight $x$ to return the scale to zero. In this position the lead $a$ just balances the weight $x$ and consequently does not move. When the order is given to heave the lead, the pulley $v$, which is loose on the axle $i^2$, is moved along this latter and is thereby clutched with the drum $i$, which latter is fixed on the axle $i^2$. The weight $x$ is then raised by the winch $x'$. The lead $a$ then rapidly runs down the remainder of the wire $d$, leaves the same, and withdraws all the wire $h$ from the drum $i$. If the lead does not strike the bottom, the hand $k'$ indicates, say 20 fathoms, on the face $k$. The lead hangs vertically from the pulley $l$ and is wound up by rotating the drum $i$ until it again arrives between the arms $z$, $z$. The drum $i$ has a ratchet wheel $i^3$ and pawl $i^4$; when the lead has been released and has unwound the wire $h$, the pawl $i^4$ is thrown into gear with the ratchet wheel $i^3$. If the lead strikes the bottom, the weight $x$ immediately rotates the drum $i$, winding up all the slack cord $h$. The ship travels forward until the pulley $i$ arrives vertically above the lead on the bottom. All the slack wire $h$ having been wound on the drum $i$, the hand $k'$ now indicates the depth of water. As the ship is still traveling forward, the lead now endeavors to drag behind the pulley $l$ and would rotate it backwards, but the pawl $i^4$ prevents such backward movement. Directly the scale $k$ stops moving, its position is noticed and the lead is again wound up. The pawl $i^4$ is released before it is possible to allow the lead to run down the wire to the position indicated in Fig. 16.

What I claim as my invention is:—

1. In sea sounding apparatus, the combination of a lead, a rotatable collar freely mounted about the center of the lead, and means carried by said collar by which the lead may be hung on a fixed inclined stretched wire.

2. In sea sounding apparatus, the combination of a lead, a rotatable collar freely mounted about the center of said lead, and hooks carried by the collar by means of which the lead may be hung on a fixed inclined stretched wire.

3. In sea sounding apparatus, the combination of a lead, a fixed inclined stretched wire, means carried by the lead by which it may be hung on to and slide down the said wire, a line attached to said lead, a drum on which said line is wound, and means for releasing the lead from the wire.

4. In sea sounding apparatus, the combination of a lead, hooks carried by said lead, a fixed inclined stretched wire, a line attached to said lead, an enlargement on said line, means operated by said enlargement for hanging the lead onto the wire, means for releasing the lead from said wire, a drum on which said line is wound, means for rapidly rewinding the drum and taking up any slack sounding line, and a pawl for preventing the drum unwinding after the apparatus has passed the point at which the lead has struck the bottom.

5. In sea sounding apparatus, the combination of a lead, hooks carried by said lead, a fixed inclined stretched wire, an enlargement on said line, means operated by said enlargement for hanging the lead on the wire, means for releasing the lead from said wire, a drum on which said line is wound, means for rapidly rewinding the drum and taking up any slack sounding line, a pawl for preventing the drum unwinding after the apparatus has passed the point at which the lead has struck the bottom, and suitable gearing operated by the winding drum to move a scale to indicate the depth of water where the lead strikes the bottom.

6. In sea sounding apparatus, the combination of a lead, a collar freely mounted on said lead, hooks carried by said collar, a stretched wire, means for raising said lead, and means for guiding one of said hooks so that it will engage the wire.

7. In sea sounding apparatus, the combination of a lead, a collar freely mounted on said lead, hooks carried by said collar, a stretched wire, means for raising said lead, a long guide plate and a short guide plate to engage and guide the hooks, a pair of springs facing each other between which the upper hook is caused to pass, one of said springs being stronger than the other to force the upper hook laterally over the carrying wire.

8. In sea sounding apparatus, the combination of a lead, a sounding line attached to said lead, a collar freely mounted on said lead, hooks carried by said collar, a stretched wire, means for guiding one of the hooks onto the stretched wire, a guide to raise the lead with relation to said wire, and a cam to wipe the carrying hook sidewise out of contact with said wire.

9. In sea sounding apparatus, the combination of a lead, a sounding wire attached to said lead, a stretched wire, hooks attached to said lead for hanging said lead on the stretched wire, a pulley over which the sounding line passes, an enlargement on the sounding line, a pair of levers the front ends of which are engaged by said enlargement on the sounding line, a cradle operated by said levers to receive and raise the lead and suitable guiding mechanism to cause one of the hooks to engage the stretched wire.

10. In sea sounding apparatus, the combination of a lead, a sounding wire attached to said lead, a stretched wire, hooks attached to said lead for hanging the lead onto said stretched wire, a pulley over which the sounding line passes, an enlargement on said sounding wire, a pair of bell crank levers the front ends of which are engaged by said enlargement, pins carried by the lower members of said bell crank levers, a lever fulcrumed to the frame having slots in which the said pins engage, a roller carried by the slotted lever, a cradle pivoted to the bell crank levers, and a cam on said cradle with which the said roller engages.

In witness whereof I have hereunto set my hand in presence of two witnesses.

MURRAY THOMAS PARKS.

Witnesses:
  H. D. JAMESON,
  A. NUTTING.